(12) United States Patent
Billet et al.

(10) Patent No.: US 10,547,919 B2
(45) Date of Patent: Jan. 28, 2020

(54) ETHERNET SWITCH FOR FIBEROPTIC NETWORK

(71) Applicant: IFOTEC, Voiron (FR)

(72) Inventors: Gilles Billet, Voiron (FR); Christian Sillans, La Frette (FR); Michaël Masselot, Saint Jean d'Avelane (FR)

(73) Assignee: IFOTEC, Voiron (FR)

( * ) Notice: Subject to any disclaimer, the term of this patent is extended or adjusted under 35 U.S.C. 154(b) by 0 days.

(21) Appl. No.: 15/544,664

(22) PCT Filed: Jan. 19, 2016

(86) PCT No.: PCT/FR2016/050093
§ 371 (c)(1),
(2) Date: Jul. 19, 2017

(87) PCT Pub. No.: WO2016/116690
PCT Pub. Date: Jul. 28, 2016

(65) Prior Publication Data
US 2018/0014094 A1 Jan. 11, 2018

(30) Foreign Application Priority Data
Jan. 19, 2015 (FR) ...................................... 15 50404

(51) Int. Cl.
*H04Q 11/00* (2006.01)
*H04B 10/40* (2013.01)

(52) U.S. Cl.
CPC ......... *H04Q 11/0005* (2013.01); *H04B 10/40* (2013.01); *H04Q 11/0067* (2013.01); *H04Q 2011/0007* (2013.01); *H04Q 2011/0039* (2013.01)

(58) Field of Classification Search
CPC ........... H04Q 11/0005; H04Q 11/0067; H04Q 2011/0039; H04Q 2011/0007; H04B 10/40
See application file for complete search history.

(56) References Cited

U.S. PATENT DOCUMENTS

| | | |
|---|---|---|
| 6,810,216 B1 * | 10/2004 | Tourunen ............... H04B 10/40 330/51 |
| 7,447,437 B2 | 11/2008 | Schunk |
| 2012/0045202 A1 | 2/2012 | Jiang et al. |
| 2012/0288279 A1 | 11/2012 | Zhang et al. |

* cited by examiner

*Primary Examiner* — Leslie C Pascal
(74) *Attorney, Agent, or Firm* — Oliff PLC

(57) ABSTRACT

The Ethernet switch for an optic fiber network includes: a first light emitter designed to transmit a light signal in the optic fiber, first photodetector configured to transform a light signal coming from the optic fiber into an electric signal, at least one communication port of electric signals with a terminal, a power supply circuit configured to supply power to the light emitter and to the first photodetector, a wake-up circuit connected to the first photodetector and to the communication port configured to generate an electric wake-up signal on receipt of a light signal by the first photodetector and/or of an electric signal on the communication port, the wake-up circuit being connected to the power supply circuit to trigger power supply of the first light emitter and of the communication port.

13 Claims, 3 Drawing Sheets

ETHERNET SWITCH FOR FIBEROPTIC NETWORK

FIELD OF THE INVENTION

The invention relates to an Ethernet switch for an optic fiber network.

STATE OF THE ART

At the present time, data transit takes place mainly in the form of a light signal which moves along an optic fiber. The optic fiber enables a very large quantity of data to be made to transit with a low attenuation.

However, in conventional manner, a computer or other communication equipment does not deliver a light signal able to transit directly in an optic fiber. A computer delivers an electric signal which transits via copper wires.

Transformation of this electric signal into an optic signal is commonly performed by a switch. In an Ethernet environment, the light data coming from an optic fiber is received by an Ethernet switch which will transmit the data to several devices, for example computers. The Ethernet switch is mutualised. In the same way, several Ethernet switches are connected to a single optic fiber so that the maximum amount of available data is able to be made to transit.

When the light signal moves from its transmitter to its receiver, it transits via a multitude of Ethernet switches. This organisation is very practical but it is also very power-consuming which limits its interest.

OBJECT OF THE INVENTION

The object of the invention is to provide a media converter switch which presents a lower electric power consumption than devices of the prior art.

This results tends to be achieved by means of a switch comprising:
 a first light emitter designed to transmit a light signal in the optic fiber,
 a first photodetector configured to transform a light signal coming from the optic fiber into an electric signal,
 at least one communication port of electric signals with a terminal,
 a power supply circuit configured to supply the light emitter and the first photodetector.

The switch is remarkable in that it comprises a wake-up circuit connected to the first photodetector and to the communication port configured to generate an electric wake-up signal on receipt of a light signal by the first photodetector and/or of an electric signal on the communication port, the wake-up circuit being connected to the power supply circuit to trigger supply of the first light emitter and of the communication port.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION

Figure 1:
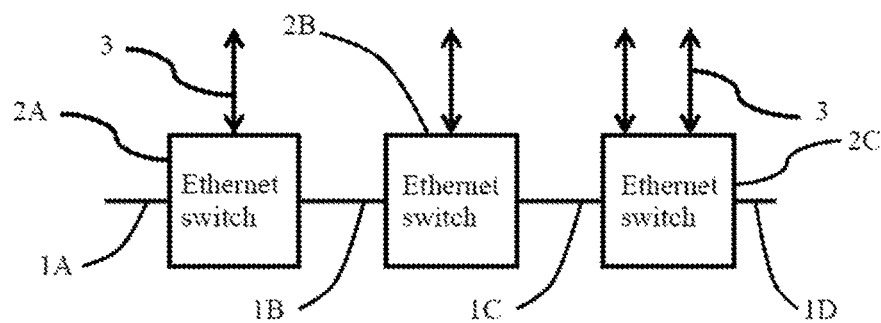
FIG. 1 represents an optic fiber network comprising three switches connected in series, in schematic manner.

FIG. 1 shows an optic fiber network 1A, 1B, 10 and 1D which comprises several Ethernet switches 2A, 2B and 2C connected in series.

When it transits in the optic fiber network, a light signal coming from the optic fiber 1A reaches the first Ethernet switch 2A and then passes through the first Ethernet switch 2A which retransmits the light signal to the following optic fiber 1B in the direction of the second Ethernet switch 2B. In this configuration, it can be observed that switches 2 have to be continually powered on in order to detect the incoming optic signal to process it and/or retransmit it. The light signal reaches for example switch 2B where it is transformed into an electric signal to be sent to a terminal via an electric signal communication port 3.

In advantageous manner, port 3 is configured to authorise transit of Ethernet connections. Port 3 is for example an RJ45 connector also called 8P8C.

It can be observed that to ensure an optimal transit of the different data within the network, a simple approach consists in continually supplying all the functionalities of switch 2.

Figure 2:
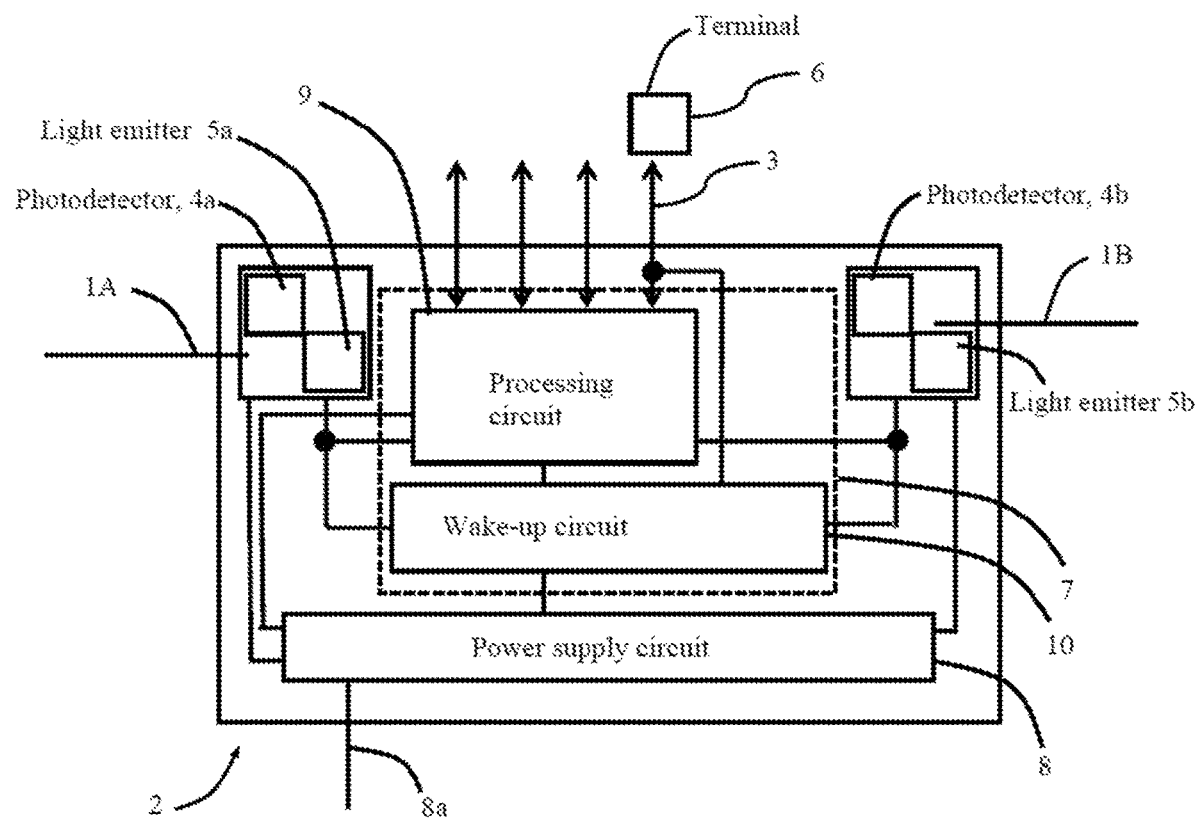
FIG. 2 represents a switch connected to two optic fibers and to four electric communication lines, in schematic manner.

As illustrated in FIG. 2, switch 2 can be broken down into several functionalities.

In conventional manner, the switch comprises a first photodetector 4a which is configured to detect the light signal coming from the first optic fiber 1A. The first photodetector 4a will transform the light signal into an electric signal.

Switch 2 also comprises a first light emitter 5a which is configured to transmit a light signal in the first optic fiber 1A. The first light emitter 5a will transform the electric signal into a light signal.

The first photodetector 4a and first light emitter 5a are connected to a control circuit 7 which is configured to process the signals received by the first photodetector 4a and to define the signals to be transmitted by the first light emitter 5a.

Switch 2 also comprises one or more communication ports 3 by electric signals which can be materialised by RJ45 standard connectors. For example purposes, switch 2 is connected to at least one terminal 6 which can be a computer and/or a camera via one or more communication ports 3.

The data supplied and/or received by communication ports 3 is processed by control circuit 7. The images captured by the camera are for example retransmitted via the optic fiber for the final user who can in return send back data triggering for example movement of the camera.

Switch 2 further comprises a power supply circuit 8 which comprises a power source and/or a power supply terminal 8a designed to be connected to a power source. Power source 8 will provide electric power to the first photodetector 4a, first light emitter 5a and control circuit 7.

In the illustrated embodiment, the switch further comprises a second photodetector 4b and a second light emitter 5b designed to be associated with a second optic fiber 1B. In this configuration, a light signal can be received from the first optic fiber 1A and retransmitted on the second optic fiber 1B and/or vice versa.

Control circuit 7 comprises a processing circuit 9 configured to process electric signals coming from ports 3 and from photodetectors 4 and to generate the electric signals which will be sent to ports 3 and to light emitters 5. Processing circuit 9 is supplied by power supply circuit 8.

One way of limiting the consumption of Ethernet switch 2 is to provide a standby mode in which certain functions of the switch are deactivated.

Once switch 2 is on standby, no signal must be sent whether it be in electric or optic form. It is therefore particularly advantageous not to supply power to light emitters 5. It is also possible not to supply the circuit configured to transmit the electric signals. On the other hand, the circuits and components involved in receipt of the signals are powered on in order to detect an incoming signal. Processing circuit 9 may not be supplied or be partially supplied.

In a particular embodiment, it is advantageous to provide a wake-up circuit 10 which will analyse the optic and electric signals to engage a wake-up phase.

To quit standby mode, a wake-up light signal is transmitted on the first optic fiber to first Ethernet switch 2. The wake-up light signal is received by the first photodetector 4a which will transmit a wake-up electric signal to the control circuit. On receipt of this wake-up signal, control circuit 7 and more particularly wake-up circuit 10 will command power supply circuit 8 to again supply light emitter 5a and/or 5b and processing circuit 9.

In advantageous manner, the new power supply of light emitter 5b will result in transmission of a wake-up signal on the second optic fiber 1B being sent to the second switch which results in wake-up of the second switch 2B.

In an advantageous embodiment, the wake-up signal comprises information on the recipient of the data to be transmitted so that control circuit 7 can determine whether pending data is intended for it or not. This information on the recipient avoids sending a wake-up signal to the following switch 2 whereas the data is not intended for it.

This embodiment is particularly advantageous when switch 2 comprises more than two connections to optic fibres which avoids needlessly transmitting a wake-up signal in an optic fiber.

In this configuration, the switches wake-up in cascade.

In similar manner, control circuit 7 can also be configured to engage standby mode when photodetectors 4 do not detect a light signal during a predefined period. In preferential manner, standby mode can be engaged if no incoming signal is received for more than one microsecond, preferably more than 3 microseconds, advantageously more than 5 microseconds. Thus, after receipt of a light signal on the first photodetector 4a, control circuit 7 performs countdown of the predefined period. If at the end of the countdown, no signal has been transmitted to control circuit 7, the latter can engage standby mode. This functionality can be integrated in a standby circuit which can be implemented with wake-up circuit 10 or in power supply circuit 8.

In this configuration, switches 2 engage standby mode in cascade.

When a terminal 6 wants to exchange data with another terminal 6 via the network, it has to transmit its data on the different optic fibers 1. This access to the network will engage wake-up of Ethernet switches 2.

In advantageous manner, the wake-up signal is initiated by terminal 6 by means of an electric connection. The electric connection connects terminal 6 to Ethernet switch 2 and more particularly with port 3. In an advantageous embodiment, the wake-up signal transmitted by terminal 6 controls a switch, for example a relay or a transistor, which in turn activates light emitter 5 or simulates receipt of an optic signal by a photodetector 4. In advantageous manner, port 3 is connected to wake-up circuit 10 so that receipt of an electric signal on port 3 triggers the wake-up phase as described in the foregoing.

It is also advantageous to provide for terminal 6 to inform switch 2 when it has terminated its communication. If switch 2 does not receive any other light signals, it can interrupt power supply of light emitters 5. Light emitter 5 being deactivated, there is no longer any signal transiting and switches 2 will switch to standby in cascade. Switching to standby of switch 2 is performed if all the signal receivers indicate that no signal is in course of receipt.

Figure 3:
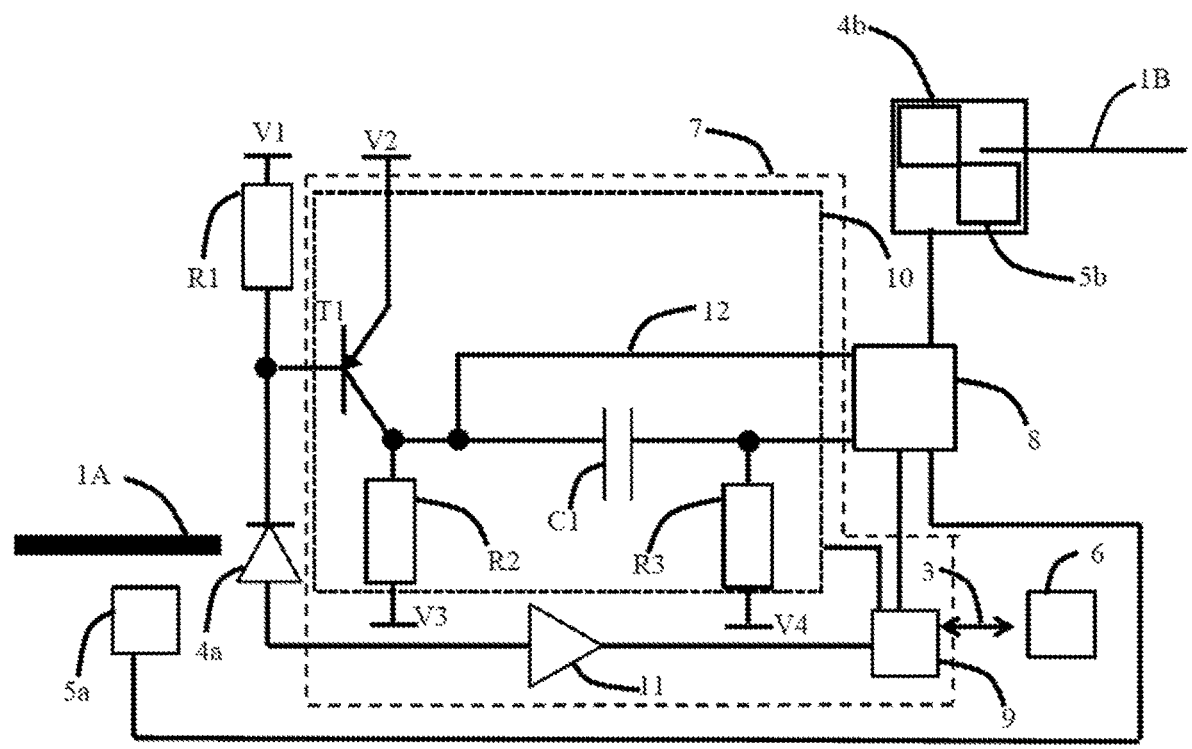
FIG. 3 represents a particular embodiment of a wake-up circuit, in schematic manner.

FIG. 3 illustrates a particular embodiment of detection of the wake-up optic signal by wake-up circuit 10.

Photodetector 4 is biased so as to transform a light signal into a representative current. In the illustrated embodiment, photodetector 4 is a photodiode.

A first terminal of photodetector 4 is connected to a first voltage source which applies a first voltage V1.

A second terminal of photodetector 4 is connected to control circuit 7 which will process the received electric signals and more particularly to processing circuit 9. In advantageous manner, a transimpedance amplifier 11 is placed between photodetector 4 and processing circuit 9 so as to shape the signal coming from photodetector 4 and to bias the photodetector 4. The trans-impedance amplifier is configured to apply a voltage $V_{REF}$. The amplifier transforms the current signal delivered by the photodetector into a voltage signal which will be processed by processing circuit 9 in logic manner. It is advantageous to use a resistor connected in negative feedback mode on the amplifier thereby forming a device of resistive transimpedance amplifier type.

Switch 2 comprises a wake-up circuit 10 which is configured to detect an electric signal transmitted by photodetector 4 in response to a received light signal. Wake-up circuit 10 is connected between the photodetector and voltage source V1 to detect an electric signal representative of the received optic signals. Wake-up circuit 10 is connected to the first terminal of photodetector 4.

Wake-up circuit 10 will transmit data which will initiate wake-up of switch 2. This data is advantageously transmitted directly to power supply circuit 8.

It is advantageous to provide a first transistor T1 having a control electrode connected to photodetector 4 so that the current transmitted by photodetector 4 modifies the current delivered by transistor T1. The signal on output of transistor T1 is therefore modified according to the light signal received. In a particular embodiment, the transistor reaches saturation as soon as a signal is received by the photodetector so that the signal on output of the transistor is of logic type, i.e. with delivery of a 1 or a 0. The light signal received is transformed into a logic signal on output of transistor T1.

A first capacitor C1 is connected between the output of first transistor T1 and 25 power supply circuit 8 in association with a first resistor R1 so that the current delivered by transistor T1 generates a current pulse forming a wake-up signal for power supply circuit 8. With receipt of a first light signal by the photodetector 4, the current transmitted by the transistor T1 is thus transformed into a current pulse which will form the wake-up signal on power supply circuit 8.

In a more precise embodiment, wake-up circuit 10 comprises a transistor T1 polarised between second and third voltage sources which respectively apply voltages V2 and V3. The first terminal of transistor T1 is connected to second voltage source V2 and the second terminal of transistor T1 is connected to third voltage source V3.

The control electrode of transistor T1 is connected to photodetector 4 so that the current flowing through transistor T1 varies according to the current transmitted by photodetector 4.

A second resistor R2 is connected between third voltage source V3 and the second terminal of transistor T1. The second terminal of transistor T1 is connected to a third resistor R3 by means of a first capacitor C1. A first terminal of first capacitor C1 is connected to photodetector 4 and a second terminal of first capacitor C1 is connected to third resistor R3.

Third resistor R3 is connected to fourth voltage source V4.

The second terminal of capacitor C1 and the terminal of resistor R3 are connected to power supply circuit 8 to supply the electric wake-up order to the latter.

In advantageous manner, a connection 12 is made between the second terminal of photodetector 4 or the first terminal of capacitor C1 and power supply circuit 8. This connection enables an electric signal representative of the light signal received to be sent to power supply circuit 10.

The first terminal of photodetector 4 is connected to voltage source V1, advantageously by means of a resistor R1. The control electrode of transistor T1 is connected between voltage source V1 and the other terminal of photodetector 4.

In this configuration, the signal detected by photodetector 4 results in transmission of a current representative of the transmitted signal. The current transmitted by photodetector 4 flows through first resistor R1 and then modifies the current intensity delivered by transistor T1.

The current delivered by transistor T1 to the assembly formed by capacitor C1 and resistor R3 will generate a pulse which will be detected by power supply circuit 8 as the wake-up signal of switch 2.

In advantageous manner, transistor T1 is a bipolar transistor the base electrode of which is connected to photodetector 4. It is also advantageous to provide for the bipolar transistor T1 to be in a saturation state when the current flows through the photodetector. In this way, the collector electrode will be close to the value of the third voltage. The ratio R1/R2 and the current gain of transistor T1 enable a detected optic power threshold to be fixed beyond which transistor T1 is saturated.

When an optic power is received with an amplitude greater than the threshold value, the current transmitted by the photodetector also reaches a threshold which will saturate transistor T1, a pulse is sent by capacitor C1 and line 12 switches to high state. Line 12 remains in high state so long as the optic power received is above the threshold value. This assembly enables a logic signal to be formed from the received light signal. This electric signal is different from the signal sent to circuit 9.

As a variant, a field effect transistor T1 can be used.

It is particularly advantageous to have the first and second voltage sources configured to deliver the same voltage, for example voltage Vcc (V1=V2=Vcc).

In this case, resistor R1 acts as a pull-up resistor to the voltage of first source V1 which enables the leakage currents of transistor T1 to be at least partially annulled.

It is particularly advantageous to have the third and fourth voltage sources configured to deliver the same voltage, for example ground (V3=V4=0).

In the illustrated embodiment, the second terminal of transistor T1 is directly connected to power supply circuit 8 by line 12. When power is supplied to a light emitter, it generates optic power and this power is read by photodetector 4. This results in photodetector 4 transmitting a current representative of activation of optic fiber 1 which results in transmission of the corresponding signal on line 12. Line 12 indicates to the wake-up circuit and to the standby circuit that the optic fiber is activated. When the optic fiber is no longer activated, the signal transmitted by line 12 for circuit 8 changes. The standby circuit can initiate standby of the switch or more particularly of the part of the switch which is associated with the deactivated optic fiber.

This configuration is particularly advantageous for management of the power supply in switch 2 when the control circuit is configured to interrupt the power supply if an optic signal is no longer received. In the illustrated case, the wake-up circuit also acts as standby circuit. As a variant it is possible to connect line 12 to the standby circuit.

In one embodiment, capacitor C1 and resistor R3 are not used. Photodetector 4 detects activation of the optic fiber and the wake-up signal is transmitted by transistor T1 which reaches its saturation. In this way, activation of the optic fiber results in activation of line 12 and wake-up of the switch. Deactivation of the optic fiber results in deactivation of line 12 and possibly in placing of the switch in standby mode.

In other words, so long as signals are received by photodetector 4, photodetector 4 sends a current and transistor T1 does likewise. Power supply circuit 8 then receives a signal representative of the activity of photodetector 4. When the optic signals stop, photodetector 4 no longer transmits any current and this absence of electric signal is received by power supply circuit 8 which can place the switch in standby mode.

However, in order to detect activation of the optic fiber better, it is particularly advantageous to use resistor R3 and capacitor C1. These two components will shape the signal transmitted by transistor T1 when the state change takes place to form a current pulse which is more easily detectable by the wake-up circuit. In this case, it is always advantageous to use deactivation of line 12 to initiate placing of the switch or a part of the switch in standby mode.

By judiciously choosing the values of first and second resistors R1 and R2, it is possible to fix the detection threshold of photodetector 4. For example purposes, it is possible to use a resistor R1 having a value of 220 KOhms and a resistor R2 having a value of 100 KOhms so as to achieve a situation in which the current causing saturation of transistor T1 is obtained for a detection threshold of the photodetector of about −24 dBm (4µ Watt). In this case, with a light emitter that can transmit an optic power of 0 dBm at 1310 nm and with a photodetector having a sensitivity of −24 dBm, it is possible to transmit signals on G652 monomode fiber over distances of up to 70 km.

Once standby mode has been engaged, the consumption of photodetector 4 is equal to its dark current which is very low. It is also particularly advantageous to interrupt power supply of processing circuit 9 to reduce the consumption of switch 2 while at the same time ensuring receipt and processing of the incoming electric signals.

Figure 4:
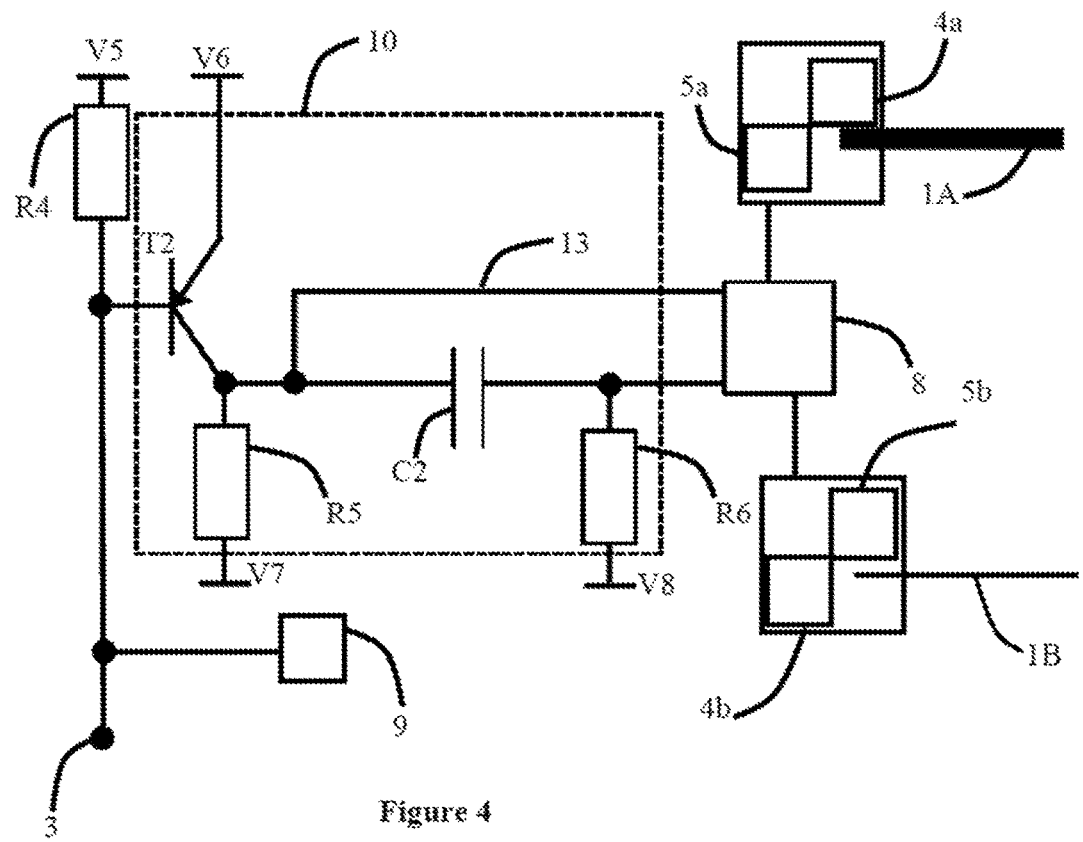
FIG. 4 represents another particular embodiment of a wake-up circuit, in schematic manner.

In an alternative embodiment illustrated in FIG. 4, wake-up circuit 10 comprises a connection with one of communication ports 3 by means of electric signals.

Wake-up circuit 10 comprises a first receipt input of a wake-up signal formed for example by port 3. This first input is connected to a fifth voltage source V5 by means of a fourth resistor R4.

A second transistor T2 is polarised between a sixth voltage source V6 and a seventh voltage source V7. The control electrode of the second transistor T2 is connected to the first input. The first terminal of transistor T2 is connected to sixth voltage source V6. The second terminal of the transistor is connected to seventh voltage source V7 by means of a fifth resistor R5.

The second terminal of transistor T2 is connected to a sixth resistor R6 by means of a second capacitor C2. A first terminal of capacitor C2 is connected to the second terminal of transistor T2. The second terminal of capacitor C2 is connected to sixth resistor R6 and to the power supply circuit. Operation of transistor T2 is advantageously identical to that of transistor T1 in order to supply a logic signal of 1 or 0 type on output.

The sixth resistor R6 is connected to an eighth voltage source V8.

In advantageous manner, the second terminal of transistor T2 is connected directly to power supply circuit 8 by line 13.

When data transmission is performed by terminal 6, the first input terminal is placed at a predefined voltage different from voltage V5, for example ground. A current then flows through fourth resistor R4. As the conditions applied on the control terminal of second transistor T2 change, a current is generated on the second terminal of transistor T2.

This current generated by transistor T2 charges second capacitor C2 which in association with sixth resistor R6 will create a pulse which is detected by power supply circuit 8 as a wake-up signal of the switch. The pulse represents the electric wake-up signal which indicates to power supply circuit 8 that terminal 6 wants to transmit data via the optic fiber. Once the signal has been detected, power supply circuit 8 engages wake-up of switch 2.

Transistor T2 is advantageously a bipolar transistor the base electrode of which is connected to the first input terminal. It is also advantageous to provide for the current transiting via the fourth resistor R4 to cause saturation of transistor T2 so that the voltage present on the collector electrode will come close to the fifth voltage. As a variant, it is also possible to use a field effect transistor.

If voltages V5 and V6 are identical, resistor R4 will act as a pull-down resistor to voltage V5 and will at least partially annul the leakage currents of transistor T2.

By adjusting the values of resistors R4 and R5, it is possible to adjust the value of the current detection threshold which triggers generation of the wake-up pulse signal.

The use of a direct connection 13 between second transistor T2 and power supply circuit 8 is particularly advantageous when power supply circuit 8 is configured to manage power supply of the different functionalities of the switch according to the signals sent by terminal 6. The operating mode of line 13 is identical to that described for line 12. The same is the case for the RC circuit formed by capacitor C2 and resistor R6 which is also advantageously the same as the RC circuit formed by capacitor C1 and resistor R3.

So long as terminal 6 sends data to switch 2, the first input terminal is on average at the predefined voltage and transistor T2 sends a current. The direct connection between transistor T2 and power supply circuit 8 is in the high state representative of a data transfer from the user. The mean value is calculated on a time base of the few milliseconds, for example 1 millisecond, advantageously between 2 and 5 milliseconds.

When the data flow stops, transistor T2 no longer transmits any current and the direct connection between transistor T2 and the control circuit switches to low state. Power supply circuit 8 detects the change of state and can initiate switching of switch 2 to standby mode.

Power supply circuit 8 is advantageously configured not to supply electric communication port 3 and the first light emitter when the first and second direct connections 12, 13 are in low state.

Figure 5:
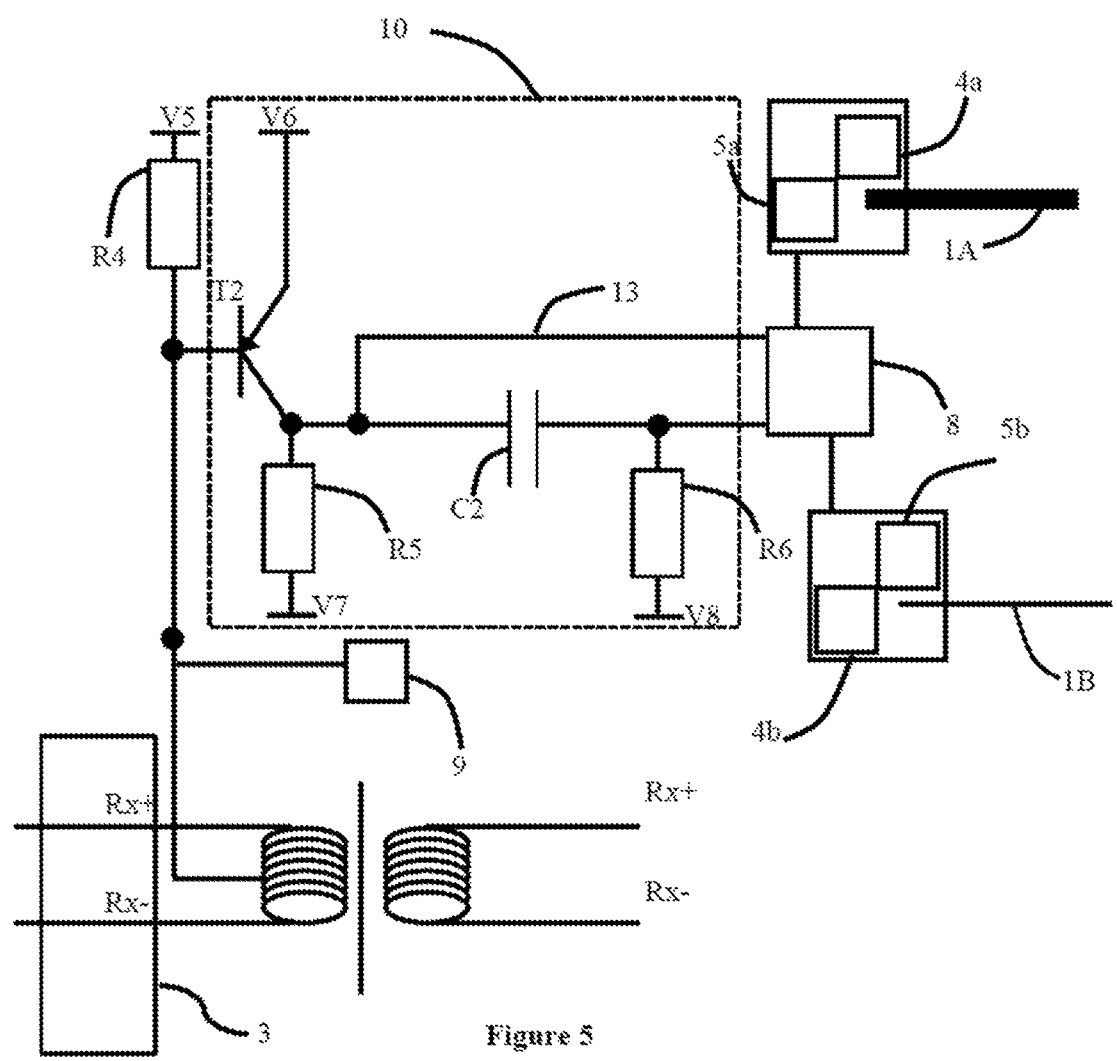
FIG. 5 represents a third particular embodiment of a wake-up circuit, in schematic manner.

In a particular embodiment illustrated in FIG. 5, the first input terminal is connected to a coil which connects the transit lines of the received signals represented by Rx+ and Rx−. Thus, so long as data is transmitted by the terminal, the first input terminal is at the predefined voltage. When data transmission stops, the voltage of the first input terminal changes and the control circuit is able to detect stopping of the data transmission. This embodiment is particularly advantageous to make the wake-up signal transit via the common mode of the communication pairs of the cables materialised by Rx+ and Rx−. The advantage of making the wake-up signal transit by the metal lines receiving the signals Rx+ and Rx− is to locate detection of activity on the optic ports which transmit optic power when they are active.

In this case, it is not necessary to use an additional communication channel for transit of a dedicated wake-up signal.

In an advantageous embodiment, it is advantageous to use the common mode of the communication pairs of the RJ45 cables between the terminal and the switch to make a specific wake-up signal transit.

In this case, the wake-up signal is input to the communication pairs Tx+ and Tx− and transits to the terminal where it is dissociated, for example according to the previous embodiments, in the communication pairs Rx+ and Rx−.

In this case, it is advantageous to provide for the control electrode of second transistor T2 to be connected to a device configured to extract the common mode of communication lines Rx+ and Rx− used for transmission of signals from terminal 6 to switch 2.

The invention claimed is:

1. Ethernet switch for an optic fiber network comprising:
    a first light emitter designed to transmit a light signal in a optic fiber,
    a first photodetector configured to transform a light signal coming from the optic fiber into an electric signal,
    at least one electric communication port configured to communicate electric signals with a communication device distinct from the Ethernet switch,
    a control circuit connected to the first light emitter, the first photodetector and the at least one electric communication port, the control circuit processing signals received from the first photodetector and the at least one communication port and transmitting said signals to the optic fiber by means of the first light emitter or to the at least one communication port, the control circuit being configured so that a data received by the first photodetector is transmitted by the first light emitter on the optic fiber and so that a data received by the at least one electric communication port is transmitted by the first light emitter on the optic fiber,
    a power supply circuit configured to supply power at least to the first light emitter and to the first photodetector,
    a wake-up circuit connected to the first photodetector and to the at least one electric communication port, the wake-up circuit being configured to generate an electric wake-up signal on receipt of a light signal by the first photodetector and to generate an electric wake-up signal on receipt of an electric signal on the at least one electric communication port, the wake-up circuit being connected to the power supply circuit to trigger power supply of the first light emitter and of the at least one electric communication port.

2. Ethernet switch according to claim 1, wherein the control circuit comprises a processing circuit supplied by the power supply circuit and configured to process electric signals coming from the at least one electric communication port and from at least the first photodetector and to generate the electric signals which will be sent to the at least one electric communication port and to at least the first light emitter, and wherein the wake-up circuit is connected to the power supply circuit to trigger power supply of the processing circuit.

3. Ethernet switch according to claim 1, wherein the wake-up circuit comprises:
 a first transistor having a control electrode connected to the first photodetector so that the current transmitted by the first photodetector makes the current delivered by the transistor change,
 a first capacitor connected between an output of the first transistor and the power supply circuit in association with a first resistor so that a current delivered by the first transistor generates a current pulse forming a wake-up signal for the power supply circuit.

4. Ethernet switch according to claim 3, wherein the wake-up circuit comprises a first direct connection between the output of the first transistor and the power supply circuit.

5. Ethernet switch according to claim 4,
 wherein the wake-up circuit comprises:
  a second transistor having a control electrode connected to the at least one electric communication port so that a voltage present on the at least one electric communication port makes a current intensity delivered by the second transistor change,
  a second capacitor connected between an output of the second transistor and the power supply circuit in association with a second resistor so that a current delivered by the second transistor generates a current pulse forming a wake-up signal for the power supply circuit, and
  a second direct connection between the output of the second transistor and the power supply circuit, and
 wherein the power supply circuit is configured so as not to supply the at least one electric communication port and the first light emitter when the first and second direct connections are in a low state.

6. Ethernet switch according to claim 3, wherein the wake-up circuit comprises:
 a second transistor having a control electrode connected to the at least one electric communication port so that a voltage present on the at least one electric communication port makes a current intensity delivered by the second transistor change,
 a second capacitor connected between an output of the second transistor and the power supply circuit in association with a second resistor so that a current delivered by the second transistor generates a current pulse forming a wake-up signal for the power supply circuit.

7. Ethernet switch according to claim 6, wherein the wake-up circuit comprises a second direct connection between the output of the second transistor and the power supply circuit.

8. Ethernet switch according to claim 1, wherein the wake-up circuit comprises:
 a second transistor having a control electrode connected to the at least one electric communication port so that a voltage present on the at least one electric communication port makes a current intensity delivered by the second transistor change,
 a second capacitor connected between an output of the second transistor and the power supply circuit in association with a second resistor so that a current delivered by the second transistor generates a current pulse forming a wake-up signal for the power supply circuit.

9. Ethernet switch according to claim 8, wherein the wake-up circuit comprises a second direct connection between the output of the second transistor and the power supply circuit.

10. Ethernet switch according to claim 8, wherein the control electrode of the second transistor is connected to a device configured to extract a common mode of communication lines used for transmission of signals from the terminal to the Ethernet switch.

11. Ethernet switch according to claim 1, wherein the control circuit processes the signal coming from the first photodetector so as to determine if a wake-up signal has to be provided to the first light emitter or to the at least one communication port.

12. Ethernet switch for an optic fiber network comprising:
 a first light emitter designed to transmit a light signal in a first optic fiber,
 a first photodetector configured to transform a light signal coming from a second optic fiber into an electric signal,
 at least one electric communication port configured receiving data from a terminal distinct from the Ethernet switch and transmitting data to said terminal, said data being electric signals,
 a control circuit connected to the first light emitter, the first photodetector and the at least one communication port, the control circuit processing signals received from the first photodetector and the at least one communication port and transmitting said signals to the first optic fiber by means of the first light emitter, the control circuit being configured so that a data received from the second optic fiber by the first photodetector is transmitted by the first light emitter on the first optic fiber,
 a power supply circuit configured to supply power at least to the first light emitter and to the first photodetector,
 wherein the control circuit comprises a wake-up circuit connected to the first photodetector and to the at least one electric communication port, the wake-up circuit being configured to generate an electric wake-up signal on receipt of a light signal by the first photodetector and on receipt of an electric signal on the at least one electric communication port, the wake-up circuit being connected to the power supply circuit to trigger power supply of the first light emitter and of the at least one electric communication port.

13. Ethernet switch according to claim 1, wherein control circuit is configured to engage standby mode when the first photodetector does not detect a light signal during a predefined period.

* * * * *